June 24, 1952 — W. G. FASTIE — 2,601,508
COMPENSATED THERMOPILE
Filed Jan. 18, 1950 — 4 Sheets-Sheet 1
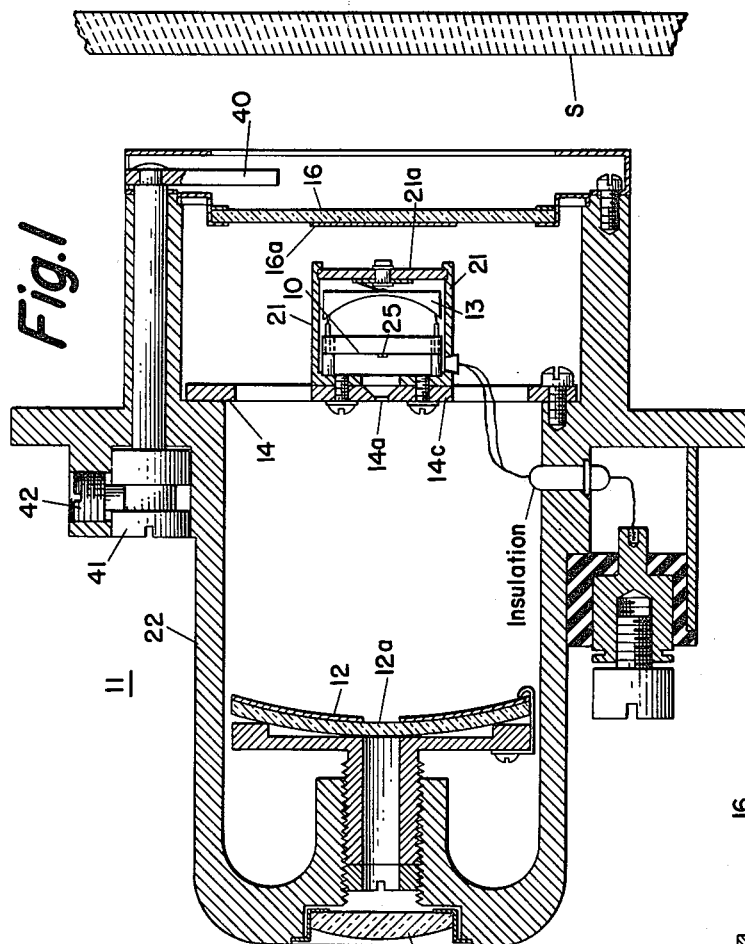
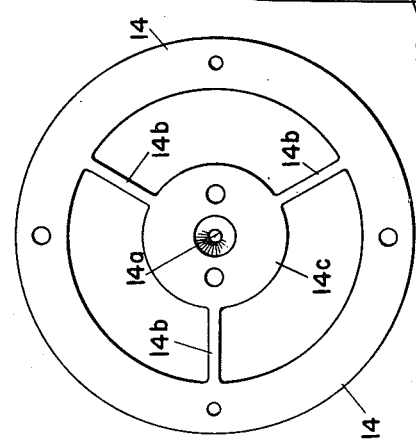
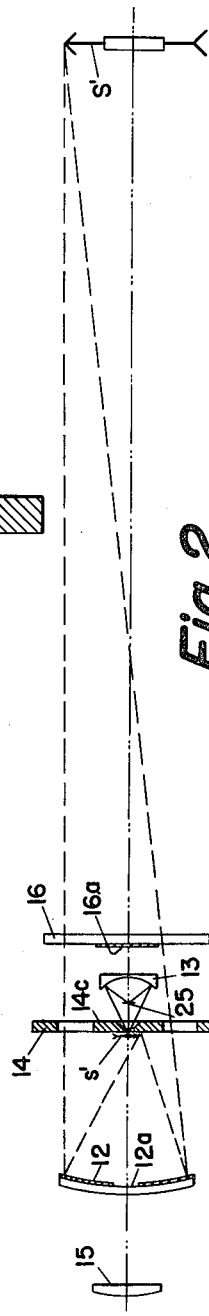
INVENTOR.
WILLIAM G. FASTIE
BY
Woodcock and Phelan
ATTORNEYS

INVENTOR.
WILLIAM G. FASTIE

June 24, 1952 W. G. FASTIE 2,601,508
COMPENSATED THERMOPILE
Filed Jan. 18, 1950 4 Sheets-Sheet 3

INVENTOR.
WILLIAM G. FASTIE
BY
Woodcock and Phelan
ATTORNEYS

June 24, 1952  W. G. FASTIE  2,601,508
COMPENSATED THERMOPILE
Filed Jan. 18, 1950  4 Sheets-Sheet 4

*INVENTOR.*
WILLIAM G. FASTIE
BY
Woodcock and Phelan
ATTORNEYS

Patented June 24, 1952

2,601,508

UNITED STATES PATENT OFFICE 2,601,508

COMPENSATED THERMOPILE

William G. Fastie, Willow Grove, Pa.

Application January 18, 1950, Serial No. 139,308

32 Claims. (Cl. 136—4)

This invention relates to electrical measuring apparatus which includes a thermocouple, a thermopile or analogous structure for measuring the intensity of radiant heat, such for example, as received from a radiant body, and has for an object the provision of a structure whose electrical output is substantially unaffected by ambient temperature. Structures of the character to which my invention is applicable are not only especially useful in the pyrometry field where it is desired to measure temperatures ranging from 300° F. to 4500° F., but also have utility generally in devices which involve measurement of radiant energy, as for example, the measurement of quantities or properties of material interposed between the structure and a source of radiant energy. There are many types of such equipment used for determination of density, material composition, etc., utilizing the transmission characteristics of the material to change the radiation received by the responsive element from a source.

In Quereau Reissue Patent 19,564, there is disclosed a compensated thermopile in which the thermocouples are constructed of iron and constantan. In accordance with the teachings of the Quereau Patent, the tendency of the temperature-difference to decrease with an increase of ambient temperature is compensated for by the rising voltage-temperature characteristic of the elements of the thermopile. In order that the tendency of the temperature-difference to decrease may be compensated by the rising voltage-temperature characteristic, Quereau proposed, among other things, the lowering of the thermal resistance between the hot and cold junctions, as by increasing thhe diameter of the thermocouple wires, so that heat could be rapidly removed by conduction from the hot junctions and the target. By this construction, radiation loss from the receiver, with resultant lowering of its temperature with respect to its surroundings, was minimized. In practice, the thermocouple wires of the Quereau thermopile were one-hundredth of an inch in diameter with a target size of one-half inch diameter. One difficulty with the thermopile of the Quereau type has been the relatively heavy mass of the thermocouple wires and the target resulting in undesirably low sensitivity and a relatively long response time. Such thermopiles have been found inapplicable to temperature measurements in the high-temperature pyrometric field where the requirements are short response time and high sensitivity.

In an effort to overcome some of the undesirable features of the Quereau type of thermopile, it has been proposed to make thermopiles of low heat capacity, low heat conductivity and of thermopile materials having a rising voltage-temperature characteristic. In most thermopiles of the last-mentioned type, the tendency of the temperature-difference to decrease with an increase of ambient temperature is not entirely compensated for by the rising voltage-temperature characteristic of the thermopile. Accordingly, it has been proposed to connect in parallel with the output terminals of the thermopile a compensating coil comprising a resistor having a suitable temperature coefficient of resistivity to provide the additional compensation needed to correct the thermopile output for ambient temperature effect.

In accordance with the present invention, it has been recognized that a number of materials ordinarily used to form thermocouples have positive temperature coefficients of heat conductivity, that is, the heat conduction increases with rise in temperature level for the same temperature-difference, and it has been further recognized that other materials have negative temperature coefficients of conductivity, i. e., the heat conduction decreases with a rise in temperature level for the same temperature-difference. More particularly, Chromel constantan and gold-nickel alloys have positive temperature coefficients of conductivity, and iron, nickel, copper and others have negative coefficients of conductivity. In the compensated thermopile of Quereau, the iron and constantan components of each thermocouple act oppositely because of the opposite sign of their coefficients of conductivity. The values of thermal conductivity of constantan and iron and the values of their temperature coefficients of thermal conductivity are such that the net thermal conductivity, for given equal length and equal 10 mil diameter wires of an iron constantan thermocouple, does not appear to change with change in ambient temperature level over a range as from 18° C. to 100° C. In thermopiles including elements of Chromel and constantan alloys, both elements have an increasing conductivity - temperature characteristic which tends to decrease the output voltage with increasing ambient temperature. Furthermore, the loss of energy from the thermopile receiver through gaseous conduction also increases with increasing ambient temperature, further tending to decrease the output voltage. Furthermore, radiation loss from the thermopile receiver increases with increasing ambient temperature, further reducing the output voltage. The rising voltage - temperature characteristic of Chromel-constantan is insufficient completely to offset all of these effects, no matter what wire dimensions or receiver dimensions, or gas is used, so that some form of compensator must be used to correct for the ambient temperature error of a Chromel-constantan thermocouple. It is desirable to use Chromel-constantan for thermocouples because of its strength, large thermoelectric effect, low thermal conductivity and thermoelectric stability.

In accordance with the present invention it has been found that a Chromel-constantan thermopile whose output is independent of ambient temperature may be produced in several ways. In one preferred form of the invention, a thermal shunt is provided between the hot junctions and the cold junctions to establish a ratio between the total heat losses and the losses along the solid conductors from the hot junctions to the cold junctions to provide a thermopile with an invariant voltage output nothwithstanding change of ambient temperature. Further in accordance with the invention, the proper control of the ratio of the heat losses along the solid conductors to the total losses from the hot junctions to the cold junctions will provide ambient temperature-compensated thermopiles.

For further objects and advantages of the invention and for a more detailed understanding of the invention, reference is to be had to the following description taken in conjunction with the accompanying drawings in which:

Fig. 1 is a sectional view of a radiation pyrometer embodying the invention;

Fig. 2 diagrammatically illustrates the optical system of Fig. 1;

Fig. 3 is a plan view of the part 14 of Fig. 1;

Figure 10:
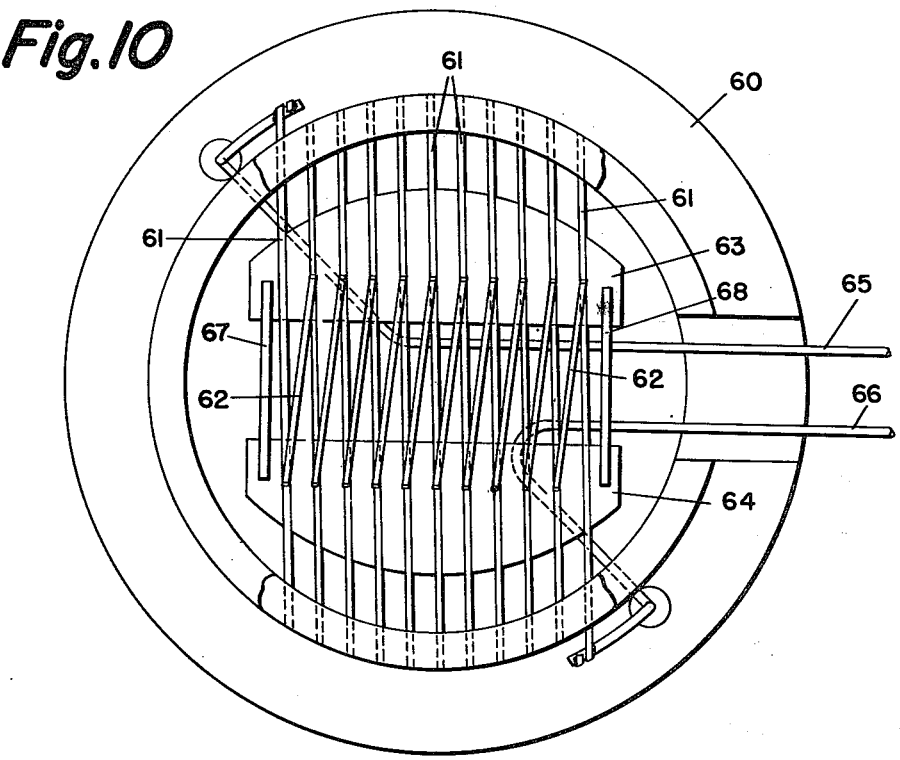
Figure 6:
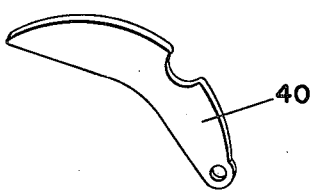
Figure 7:
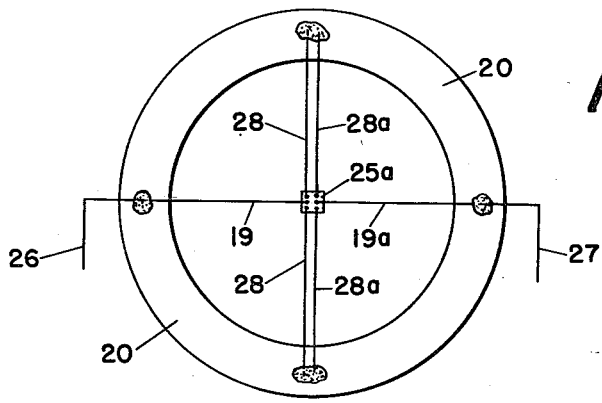
Figure 8:
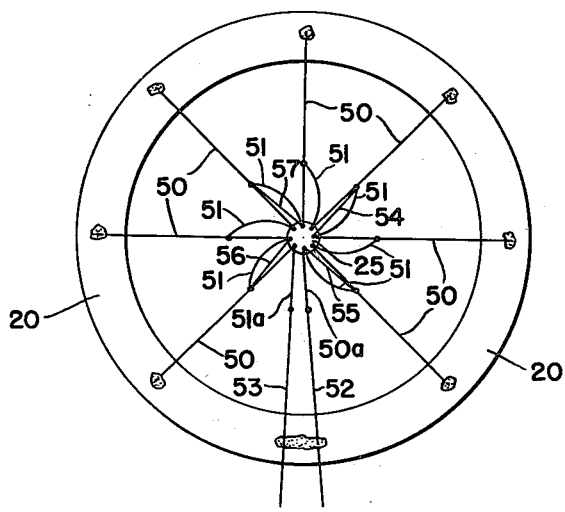
Figure 9:
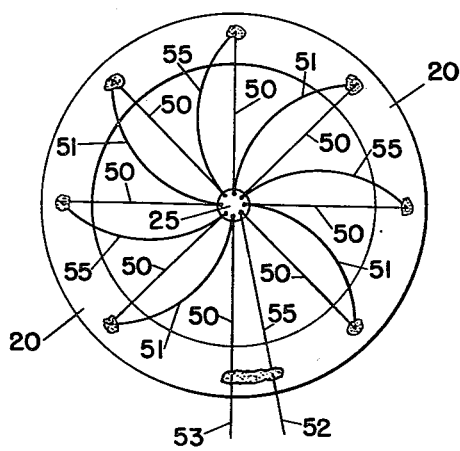

Fig. 6 is a perspective view of an adjustable light trimmer 40 secured to the shank of a screw 41 in Fig. 1 which can be locked in fixed position by a locking screw 42;

Fig. 7 is a plan view of a thermopile assembly of a thermopile embodying the invention; and Figs. 8, 9 and 10 are plan views respectively of further modifications of thermopile assemblies embodying the invention.

Referring to the drawings, the invention in one form has been shown applied to the sensitive element or thermopile 10 of a radiation pyrometer 11 which includes a suitable optical system. The optical system of the radiation pyrometer 11 limits the energy received by the thermopile to that emanating from a sharply defined area of the surface of the hot body and produces a radiant energy flux of increased density at the sensitive element or detector 10 by employing a two-mirror optical system which includes the concave mirror 12 and the concave mirror 13. There are combined the energy-concentrating property of a wide angle optical element with the sharp image-forming property of a narrow angle optical element. In Fig. 1, the narrow angle primary mirror 12 produces on a diaphragm 14 an image of the source S, illustrated as a section of a refractory wall or other heat-radiating body. In Fig. 2 the source S is represented by an arrow S', and the image thereof by the arrow s'. Radiation from only the sharply defined portion of the source represented by that part of the image s' in front of opening 14a of the diaphragm passes through that opening 14a to the wide angle secondary mirror 13 which redirects and concentrates the received radiation upon the thermopile or detector 10. The mirror 13 forms an image of the opening 14a on the target of the thermopile, which image is smaller than the target 25, Fig. 3. Due to the mirror 13, the density of the radiant energy on the target of the detector is greater than it is at the opening 14a.

It is to be further observed that the mirror 12, because not silvered at its central portion, provides a transparent opening 12a through which there may be viewed through the eyepiece 15 the image s', Fig. 2, projected on the plate 14. It is a feature of the present invention to provide a coating of magnesium oxide on the surface of plate 14 facing opening or aperture 12a. The coating has the following properties: It does not scatter or reflect appreciable radiation in the infra-red region where the greater amount of radiant energy from hot bodies is located. Hence, that surface does not result in errors due to the presence of scattered radiation. Radiation entering pyrometer 11 from other than the optical line of sight is not reflected within the housing since all interior surfaces are coated with a dull black paint except the window, mirrors and the surface coated with magnesium oxide. The latter coating provides a visual image of the sharply defined area of the source and, hence, provides a means by which the pyrometer may be sharply focused. A window 16 is provided to protect the interior of the instrument from ingress of foreign material. The eyepiece 15, the window 16 and the housing as a whole may be sealed for operation of the thermopile under subatmospheric or superatmospheric pressure. The window 16 may be made of quartz or other material which will pass energy in the infra-red region and which will withstand the heat to which it may be subjected in use.

When the thermopile is thermally insulated from its surroundings, the transient effects due to sudden changes in ambient temperature may be reduced. However, the insulated system does not permit absorbed radiant energy readily to leave the thermoelectric system, with the result that the thermopile can be heated to undesirably high operating temperatures if subjected to intense radiation. In accordance with the present invention, the thermopile is not thermally isolated, but nevertheless, its output is not to any substantial extent changed by a rapidly varying ambient temperature. This is accomplished by adjusting the physical dimensions of the parts associated with the cold junctions and the parts associated with the hot junctions, so that they respond in like manner to changes in ambient temperature. More particularly, it will be observed, Fig. 4, that the cold junctions 18 of the thermocouples 19 are in intimate heat-conductive relation with a metal mounting ring 20. Though electrically insulated therefrom, they are thermally intimately connected thereto as by a suitable ceramic cement. The mounting ring 20 may be of any suitable metal such as nickel or copper. The ring 20 is thermally connected to an outer housing 21, Figs. 1 and 5, through three metallic legs 20a, 20b and 20c which may be integral with the ring 20, or they may be riveted or welded inserts. The copper housing 21 and plate 14 form a thermal shield completely surrounding the thermopile except for the opening 14a which allows radiation to pass to the mirror 13. The copper housing 21 is in thermal and metallic contact with the diaphragm 14, which is itself preferably made of heavy copper, and is along a shoulder of housing 22 in metallic and thermal contact with it. The diaphragm 14, Fig. 3, has three legs 14b spaced 120° apart interconnecting a central supporting disc 14c and the rim of the diaphragm. To increase the flow of heat from the thermopile housing 21 to the pyrometer housing 22, the legs 14b may be made larger, particularly in cross-sectional area. The size of the extensions 20a, 20b and 20c, Fig. 4, and the thickness of the copper legs 14b are so proportioned as to maintain the supporting disc and housing 21 at substantially ambient temperature. The thermal conduction thus provided is effective to achieve the foregoing objective when measuring the energy in an intense radiation field.

Figure 5:
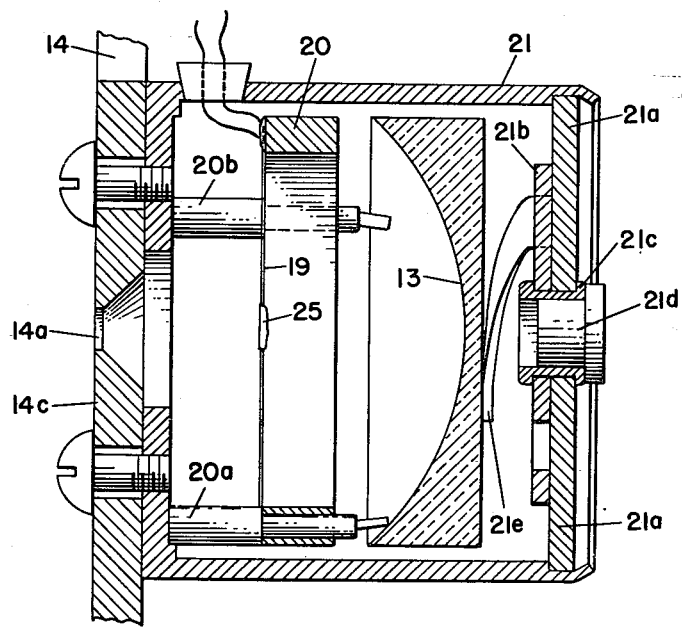
Fig. 5 is an enlarged sectional view of the sensitive element and including its housing, with member 14 of Fig. 1 secured thereto.

Referring to Fig. 5, it is to be observed the extensions 20a, 20b and 20c are formed by pins having enlarged end-portions which abut against the inturned ends of the housing 21 which receive the threaded ends of screws extending through the plate 14. The pins have reduced portions which are pressed into openings of the ring support 20 of the thermopile, and each pin is provided with further reduced end-portions bent slightly toward the axis of the housing 21 for engaging at points spaced approximately 120° apart the concave face of the mirror 13, a spring extension 21e from member 21b engaging the back of the mirror 13 to press it against the ends of the three pins. The spring-carrying member 21b is secured to an end-screw 21a of housing 21 by a hollow rivet 21c which is preferably provided with a block 21d to prevent entry of radiation into the housing 21. It is to be observed that the openings in plate 14 through which the fastening screws extend are made somewhat larger than the shank of the screws to provide for optical adjustment of housing 21 relative to the opening 14a in plate 14, thus providing for optical adjustment of the illustrated assembly with reference to plate 14.

Figure 4:
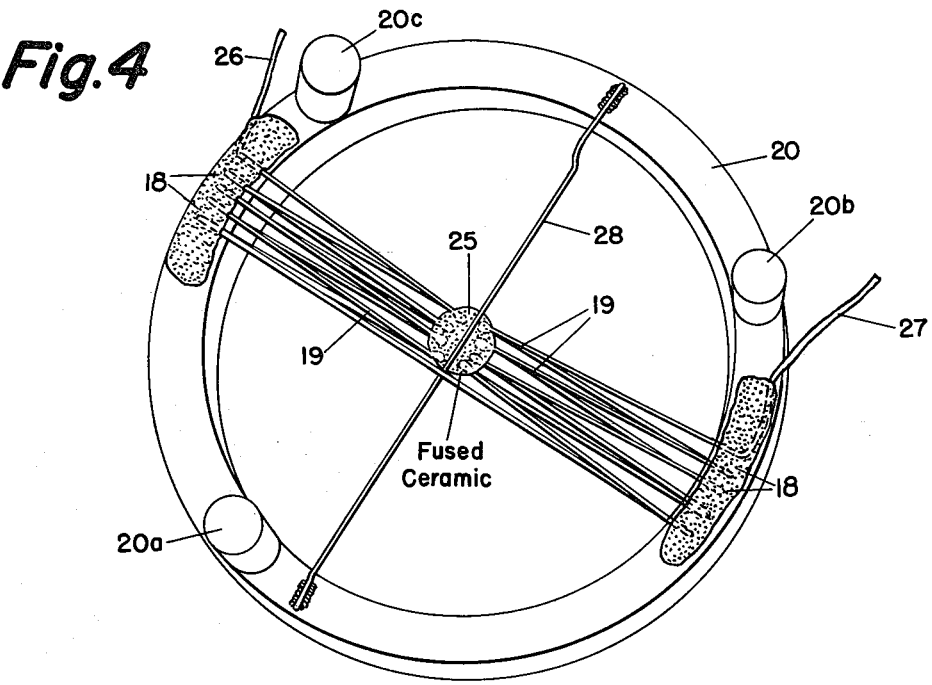
Fig. 4 is a perspective view of the sensitive element and associated parts of Fig. 1, greatly enlarged.

With the above understanding of the elements of the radiation pyrometer thus far described, attention will now be directed to the thermopile itself, the materials of which it is made, the proportioning of the parts, and the thermal and electrical functions of the parts which are best shown in the enlarged isometric view of Fig. 4. The several thermocouples 19, four of them extending diametrically to the right and four to the left respectively of the target 25, have their hot junctions intimately in thermal contact with the target 25 but electrically insulated therefrom. More particularly, the target or radiation receiver 25 includes a platinum disc to which is secured, as by a ceramic glaze, a disc of mica. The hot junctions of thermocouples 19 are secured to the mica disc in like manner. Preferably a small quantity of powdered black ceramic material, known as a frit, is placed on the mica disc. Upon application of heat the frit is melted to form a fused coating to secure the hot junctions to the mica disc and to provide a black radiation-absorbing surface facing the mirror 13.

It is well understood by those skilled in the art that the electromotive force generated between the output conductors 26 and 27 by the eight thermocouples connected in series-aiding relation will vary in magnitude with change in the difference between the temperature of the hot junctions at the target 25 and the temperature of the cold or reference junctions 18. When no radiation from an external source is directed to the hot junction target 25, it is desired that no electromotive force shall appear between output conductors 26 and 27. Such a result will always obtain when the hot junctions and the cold junctions are at the same temperature. However, those skilled in the art have long been concerned with the problem of correcting or eliminating a voltage output when the thermopile is subjected to a sudden change in ambient temperature which produces a difference in temperature between the hot junctions and the cold junctions. More particularly, if the temperature of the cold junctions should suddenly rise above or fall below the temperature of the hot junctions, there will be produced a corresponding or appreciable change in electromotive force, which change may disappear when conditions equalize. However, if the temperature of the instrument is maintained at a level different from that of other objects in its vicinity, for example, if it is partially in contact with a cold surface and partially in contact with a hot surface, there will be a continuous flow of heat through the instrument, which can produce a sustained output signal, if the cold and hot junctions are not on the same isothermal. From the foregoing it will be understood that a transient error as well as a sustained error may be introduced even when no radiation from a hot body is incident on the hot junction target or receiver 25. The foregoing factors do not adversely affect operation of the pyrometers disclosed herein by reason of the structural provisions including ring 20, its pins 20a—20c, housing 22, and plate 24.

When a thermopile is receiving radiation at a constant rate and has reached a condition of equilibrium, its hot junction target will be losing heat at exactly the same rate as it is receiving it. Accordingly, the manner in which the hot junction target loses heat is of prime importance. There are three modes or channels of heat-loss: (1) gaseous, by conduction and convection; (2) conduction, through solid materials, such as the thermocouple elements themselves; and (3) reradiation, from the target to the walls of the enclosing cavity and through the window or opening 14a.

The foregoing may be mathematically stated for a condition of equilibrium as follows:

$$E_r = L_g + L_s + L_r \qquad (1)$$

where $E_r$ = radiant energy input to the target
$L_g$ = gaseous losses
$L_s$ = solid conduction losses
$L_r$ = radiation losses Both the gaseous losses and the solid conduction losses follow Newton's law of cooling, that is, the rate of each loss is proportional to the temperature-difference; in the one case proportional to the temperature-difference between the target and the atmosphere within the thermopile housing 21 which is substantially at the temperature of the cold junctions and at ambient temperature in general because of the action of the copper enclosure 21 and its heat-conducting mounting; and in the other case proportional to the temperature-difference between the hot junction target 25 and the ring 20 which likewise is maintained substantially at ambient temperature by means of the restricted heat-conducting mounting including projections or legs 20a, 20b and 20c and legs 14b. While the radiation loss is in accordance with the Stefan-Boltzman law, the usual range of temperature-difference between the hot junctions and the cold junctions is generally below 60°, and the fraction of loss by radiation is small. Accordingly, radiation loss can be approximated by Newton's law of cooling instead of taking into account the difference between the fourth powers of the respective hot and cold junction temperatures.

Two other factors are of importance in thermopiles particularly adapted to pyrometric temperature measurement. First, the sensitivity should be high. For greater sensitivity, there should be minimized the rate of transfer or loss of heat from the hot junction target 25. Secondly, the speed of response should be high. Since this will depend upon the time required for the hot junction target 25 to attain its final temperature, it is desirable to reduce its heat capacity. This is done by reducing its thermal mass.

The thermocouple wires are selected for high thermoelectric power, resistance to oxidation, uniformity of drawing and the constancy and reproducibility of their thermoelectric power characteristic. Thermocouples of Chromel and constantan alloys meet the foregoing requirements, and even for small sizes, have adequate strength. The slope of their temperature-electromotive force curve increases with increasing temperature. Heretofore, it has been necessary with Chromel-constantan thermocouples to utilize a compensating coil connected across the output wires of the thermopile in order completely to compensate for change in ambient temperature. With a compensating coil arrangement, the operation of the thermopile is converted from an electromotive force measurement to a current measurement, that is, the drop of potential through the compensating coil is measured rather than the electromotive force of the thermopile. In contrast, in accordance with the present invention, the electromotive force of the thermopile is measured; and when there is zero temperature-difference between the hot junctions and the cold junctions, there is zero output across the output conductors; and when the output electromotive force is balanced by an equal electromotive force from a potentiometer circuit, there is zero current-flow in the circuit.

In accordance with the present invention, the thermopile is completely compensated for change in ambient temperature without the use of a compensating coil by control of the flow of heat between the hot and cold junctions. In accordance with one form of the present invention, there is utilized one or more Chromel-constantan thermocouples. The Chromel alloy and the constantan alloy have positive temperature coefficients of thermal conductivity, that is, as the temperature of each increases, it becomes a better conductor of heat; whereas, iron, nickel and, in fact, most pure metals have negative temperature coefficients of thermal conductivity, that is, as their temperatures increase, they become poorer conductors of heat. Accordingly, it will be seen that with a Chromel-constantan thermocouple, a rise in ambient temperature causes a decreased rise in the temperature of the hot junctions over that of the cold junctions because of an increase in the conduction of heat by both the Chromel and the constantan. This decreased rise in the hot junction temperature relative to the cold junction temperature will develop with rising ambient temperatures, whereas in the case of thermocouples including elements of copper, iron or other relatively high heat-conducting elements in combination with antimony, the effect will be to decrease the heat-flow from the hot junction, and the hot junction temperature will rise faster than the cold junction temperature.

In one form of the present invention the fully compensated thermopile is provided by the thermal shunt 28 which modifies and controls the flow of heat in such manner as to make the operation of the thermopile substantially independent of ambient temperature change. Thus, there is avoided the need of a compensating coil connected across the output conductors of the thermopile with its consequent disadvantages.

The thermal shunt functions independently of the electrical components and yet by its flow-control of heat modifies the output of the electrical components in compensation for changes in the ambient temperature and the like.

In the absence of a compensating coil and of a thermal shunt, the effect of the positive temperature coefficient of heat conductivity, both for air and for the solid conductors, will be to increase the relative amount of flow of heat from the hot junction region 25 to the cold junction region 18 with rise of ambient temperature. Such a disproportionate rise in thermal conductivity means that the actual temperature of the target 25 will be somewhat less than it should be in order to maintain the necessary difference between the hot and cold junctions necessary to produce the desired electromotive force. However, by adding the thermal shunt formed by the nickel wire 28, the thermal impedance as the ambient temperature rises does not decrease as much as before its addition. Accordingly, the temperature rise of the hot junction area formed by the target 25 will be more nearly in keeping with ambient temperature rise than it would otherwise be with only positive coefficient paths, because of the proportionately less loss of heat through the nickel at the higher temperatures. Accordingly, the electromotive force output will be higher. It is in this way that compensation is provided since it is only necessary relatively to proportion the sizes of the Chromel and constantan wires, with respect to the size of the wire 28 forming the thermal shunt.

While dimensions and detail design specifications will hereinafter be presented for typical modifications of the invention, an explanation will now be given of underlying theory and a procedure by means of which the invention may be applied to a wide range of materials with either positive or negative coefficients of heat conductivity, and by means of which fully compensated thermopiles may be produced in the absence of a separate element forming the thermal shunt, such thermocouples including equivalent heat-conduction paths formed by elements of the thermocouples themselves.

The equilibrium equation for the thermopile has already been expressed as follows:

$$E_r = L_g + L_s + L_r \qquad (1)$$

It is well known that within the temperature range of 0° C. to 200° C. the conduction of heat over the solid paths, as through the thermocouple elements, and the conduction of heat through the atmosphere can be represented by Newton's law of cooling which states that the magnitude of the conducted heat energy between any two points in a thermal system is dependent upon the temperature-difference between said two points. It is also well known that the thermal conductivity over the foregoing temperature range of most gases or solids varies in a linear fashion with change in temperature level. It is also well established that radiation loss follows Newton's law and the linear variation of thermal heat exchange for small temperature-differences, provided the magnitude of the radiation loss is small with respect to the solid conduction losses and with respect to the gaseous conduction losses. Accordingly, any term on the righthand side of Equation 1 can be written in the form:

$$L = M(1+mT)\Delta t \qquad (2)$$

where $L$ = component loss
$M$ = thermal conduction of the material of the particular path
$m$ = temperature coefficient of thermal conductivity
$T$ = ambient temperature above an arbitrary reference level
$\Delta t$ = temperature-difference between the two points of conduction and substituting equivalent terms in Equation 1, it may be written:

$$E_r = [G(1+gT) + S(1+sT) + R(1+rT)]\Delta T \qquad (3)$$

where $G$ = gas loss factor involving receiver area, dimensions of housing and physical properties of the gas in the housing
$g$ = temperature coefficient of gas loss
$S$ = solid conduction factor involving length, cross-sectional area and specific heat conductivity of solid supports of the receiver
$s$ = temperature coefficient of solid conductivity
$R$ = radiation loss factor
$r$ = temperature coefficient of radiation loss
$\Delta T$ = temperature-difference between the hot and cold junctions The voltage developed by a thermopile due to ambient temperature change may be expressed in terms of temperature-difference between the hot and cold junctions in a form similar to Equation 2, namely:

$$\Delta V = N(A+CT)\Delta T \qquad (4)$$

where $A$ and $C$ are temperature-voltage constants depending on the materials which make up the thermocouples, and
$N$ represents the number of thermocouples.

The constants $A$ and $C$ may be determined from the thermo-electric power characteristics of the thermocouple materials used, in the example Chromel and constantan, as expressed by the equation:

$$\Delta V = (A+CT)\Delta T \qquad (5)$$

where $\Delta V$ = the voltage change for a small change in temperature, $\Delta T$, and is generally expressed in microvolts, and
$T$ = the ambient temperature above the reference level hereinbefore referred to.

More particularly, at the reference level of 60° F., which for purposes of calculation may be taken as $T_0$, or $T=0$, the output $\Delta V$ may be taken as a zero reading. For a change, a rise in temperature of one degree, the output will increase by thirty-three microvolts. For temperatures of one hundred degrees and of one hundred and one degrees, above the reference level, the outputs $\Delta V$ will be 3450 and 3486, a difference of thirty-six microvolts. Hence, using the data at the reference level $A$ will be found to have a value of 33. Using the data at the higher level in Equation 5:

$$36 = A + 100C$$

or $$36 = 33 + 100C$$

and $$C = 0.03$$

By combining Equations 3 and 4, an expression for $\Delta V$ can be obtained:

$$\Delta V = \frac{N(A+CT)E_R}{G(1+gT)+S(1+sT)+R(1+rT)} \qquad (6)$$

A condition for $\Delta V$ to be independent of changes in ambient temperature (i. e., the value of $T$) can be mathematically expressed by the equation:

$$\frac{d\Delta V}{dT} = 0 \qquad (7)$$

Performing the mathematical operation upon Equation 6 indicated by Equation 7, there results, when $$\frac{d\Delta V}{dt} = 0$$

$$0 = \frac{C}{A} - \frac{Gg+Ss+Rr}{G+S+R} \qquad (8)$$

and transposing and inverting:

$$\frac{A}{C} = \frac{G+S+R}{Gg+Ss+Rr} \qquad (8a)$$

It is seen from Equation 8 that a thermopile will be ambient temperature-independent if the physical dimensions and/or physical constants of the materials of the thermopile have the proper values to satisfy the conditions set forth by Equation 8. In accordance with the present invention, there will be hereafter disclosed the physical dimensions and/or physical constants which will satisfy the conditions set forth by Equation 8.

The six unknown constants may be determined by solving six simultaneous equations of the general type of Equation 6 already set forth, and which are as follows:

$$\Delta V_a = \frac{NAE_R}{G+S+R} \qquad (6a)$$

$$\Delta V_b = \frac{N(A+100C)E_R}{G(1+100g)+S(1+100s)+R(1+100r)} \qquad (6b)$$

$$\Delta V_c = \frac{NAE_R}{S+R} \qquad (6c)$$

$$\Delta V_d = \frac{N(A+100C)E_R}{S(1+100s)+R(1+100r)} \qquad (6d)$$

$$\Delta V_e = \frac{NAE_R}{G+S+2R} \qquad (6e)$$

$$\Delta V_f = \frac{N(A+100C)E_R}{G(1+100g)+S(1+100s)+2R} \qquad (6f)$$

For the several measurements of the voltage output of the thermopile a radiant input signal of known and constant intensity will be applied to the target of the thermopile. The measurement for Equation 6a will be made with the ambient temperature at a reference level of 60° F. It will be recalled that only the radiation-receiving face of the receiver or target 25 is blackened by the fused ceramic frit and, thus, the first measurement for Equation 6a will be made without change in structure.

The voltage output of the thermopile will then determine the magnitude of the term $\Delta V_a$ of Equation 6a.

For Equation 6b the ambient temperature will be increased 100° F. to a new temperature of 160°

F. and a new voltage output obtained which will determine the value of $\Delta V_b$.

The radiation receiver or target 25 will then be evacuated in conventional manner, the housing for the pyrometer already having been described as capable of being sealed for subatmospheric operation. For this measurement, the pressure should be less than one ten-millionths of an atmosphere. There will then be obtained $\Delta V_c$ of Equation 6c, for an ambient temperature at the reference level of 60° F.

For Equation 6d the same measurement will be repeated with the thermopile under the same vacuum, but with an ambient temperature 100° F. above the reference level for determination of $\Delta V_d$.

The other face of the target or radiation receiver 25 will then be blackened, and with both faces thereof black, measurements are made at the reference level of 60° F. and 100° F. thereabove, as at 160° F., for determination respectively of $\Delta V_e$ and $\Delta V_f$ of Equations 6e and 6f.

Since $E_R$ in each of the six Equations 6a to 6f is known, the six simultaneous equations now contain only six unknowns, namely G, S, R, g, s, r, which can be determined by simultaneous solution.

It will now be assumed that a thermopile of suitable construction has been tested and the values of G, S, R, g, s and r determined. It will be further assumed that the thermopile is not compensated, i. e., its output varies with change in ambient temperature. It will be recalled that for ambient temperature-independence, Equation 8 must be satisfied. In accordance with the present invention, Equation 8 may be satisfied by adding to the thermopile, a thermal shunt. Further assuming that C and A have been determined for the thermopile in question, the addition of the thermal shunt of conductance S' and coefficient of thermal conductivity s' of proper sign and known value will supply terms to Equation 8 which will meet its requirements, for example, $$0 = \frac{C}{A} - \frac{Gg + Ss + Rr + S's'}{G + S + R + S'} \quad (9)$$

Since the only unknown in Equation 9 is S' (s' being known for the selected material), it can be ascertained. The resultant conductance S' is related to the dimensions of the thermal shunt of one or more paths and to its conductivity, that is to say:

$$S' = \frac{NPA}{L} \quad (10)$$

where

N = number of shunt paths
P = conductivity of the material thermal shunt
A = cross-sectional area of each shunt path
L = length of one shunt path Accordingly, the dimensions of the thermal shunt may be readily ascertained.

Pursuant to the foregoing, the thermopile in Figs. 1-5 was provided with a thermal shunt formed by a nickel wire of .005 inch in diameter, the Chromel-constantan wires each being made of wire 2 mils in diameter flattened to 1 mil thickness. The larger diameter of the pins 20a, 20b and 20c extending from the ring 20 was .049 inch, the length thereof from the ring to the plate 14 being .106 inch. It is to be observed there is an air space between the ring 20 and the heat-conductive housing 21, and between the pins 20a—20c of that housing. Thus, substantially all of the heat flow is limited from the ring 20 through the solid heat-conduction paths provided by the enlarged ends of pins 20a—20c. Though the diameter or cross-sectional area of pins 20a—20c can be varied to some extent, it is desirable to have its dimensions of the same order as those herein set forth in relation to the other dimensioning of the associated parts. Thus, the provision of the restricted heat-conducting paths provided by pins 20a—20c, together with the high heat-conductivity housing 21 including its high heat-conductivity enclosure 21a, has been found to minimize and to overcome substantially entirely rapid or transient effects of the change in ambient temperature, more particularly to prevent the appearance of transient voltages at the output of the thermopile due to such rapid changes.

In this connection it is to be observed that the housing 21 is conductively related to the outer housing 22 through its heat-conductive association with the plate 14. Reference to the dimensioning of the spokes thereof has already been referred to, and it will be recalled that they provide heat-conductive paths between the housing 21 and the outer housing 22, and thereby limit or make lower the rise of temperature of the housing 21 and the associated assembly when the pyrometer is subjected to an intense radiation field. Because of the physical construction referred to, the spokes of the plate 14 may be made larger than would otherwise be the case to provide better heat-conducting paths. The thickness of the housing 21 is determined in relation to the diameter of the pins 20a—20c and the dimensioning of the ring 20. Since the effect upon the thermopile and the function thereof in avoidance of transient voltages due to rapidly varying changes in ambient temperature is dependent upon the interrelation of these parts, it is to be understood that they may be varied so that different dimensions can be utilized for each, other than those in a typical embodiment where the housing 21 was made of copper of .025 inch thickness, the ring 20 of .049 inch radially and .094 inch axially. More particularly, if the thickness of housing 21 be increased, the diameter of the legs 20a-20c will be increased, or they may remain the same diameter, in which case the thermal capacity of the ring 20 will be decreased as by axially shortening it or making it of less radial thickness, or the materials may be selected in terms of their relative heat conductivity and heat capacity.

It is believed it will now be helpful to present a numerical example which will be done in terms of the modification of Fig. 8, constructional details of which will be later presented and which comprises eight Chromel-constantan thermocouples of 3-mil diameter wire size. The constants G, S, R, g, s, r, C and A, determined as above indicated are as follows:

G = 129 microwatts per degree F.
S = 129 microwatts per degree F.
R = 5.3 microwatts per degree F.
g = .0009 microwatt per degree per degree F.
s = .002 microwatt per degree per degree F.
r = .005 microwatt per degree per degree F.
$\frac{C}{A}$ = .0009 microwatt per degree F.

Inasmuch as the Chromel-constantan thermopile will not be compensated, it will be assumed that copper will be selected for the thermal shunt. Accordingly, s' = —.00007 microwatt per degree per degree F.

The foregoing values may be inserted in Equation 9 since that equation expresses the conditions which must be met to provide a thermopile whose output will not vary with change in ambient temperature. The only unknown from Equation 9 will be S'. Solving Equation 9 for the value of S', there will be obtained:

$S' = 174$ microwatts per degree F.

It is now only necessary to substitute the value of S' in Equation 10 since it can be arbitrarily decided that four thermal shunt paths will be provided, i. e., $N=4$, the conductivity of the copper from which it has been decided to construct the thermal shunt being known, i. e., $P=4.8$ watts per square inch per inch per degree F., and the length of each shunt path being known, since it will be the distance between the hot and cold junctions of each thermocouple, specifically .25 inch. Accordingly, solving Equation 10 for A, the area, there will be obtained:

$A = 2.3 \times 10^{-6}$ square inches this corresponding with a wire size of 1.7 mils diameter. In practice, it has been found that thermal shunt of 2 mil diameter is highly satisfactory and avoiding any change upon the output of the thermocouple due to change in ambient temperature between the range of 60° F. and 160° F. Thus, there is close correlation between the mathematical explanation of the underlying theory and the experimental verification thereof.

In terms of Fig. 1, and further substantiating the underlying theory of the present invention, the constants applicable to the thermopile of Figs. 1–5 comprising the eight thermocouples, each of Chromel-constantan flattened 2-mil wires, the constants G, R, $g$, $s$, $r$ and $$\frac{C}{A}$$

will be the same as set forth above. Constant S will be equal to 57 microwatts per degree F.

In accordance with the invention, the use of a nickel shunt will be preferred inasmuch as it has a more negative temperature coefficient of conduction than the copper and, hence, will adequately perform its corrective function with a smaller conducting factor and, thus, there will be less loss of heat due to the provision of the thermal shunt. Accordingly, the constant $s'$ for the nickel shunt will be equal to $-.0002$ microwatt per degree per degree F. In accordance with Equation 9, S' may be determined to be 77.3 microwatts per degree F.

As indicated in Figs. 1–5, there will be two shunt paths each having a length of .25 inch, and the specific conductivity of the nickel will be equal to .746 watt per sq. inch per inch per degree F. Solving Equation 10, for the area A, there will be obtained a value of $12.2 \times 10^{-6}$ square inches, this corresponding with the nickel shunt of approximately 4 mils diameters. In practice, a 5 mil diameter nickel shunt was found fully to compensate the thermopile or to provide a voltage output independent of change in ambient temperature.

Applying the foregoing analysis to the modification of Fig. 7, the calculations indicated an area for the thermal shunt equal to $4.2 \times 10^{-6}$ square inches. In practice this area was provided by using two 2-mil nickel shunts and two 1-mil nickel shunts, the cross-sectional area of the nickel shunts being $3.9 \times 10^{-6}$ square inches, thus showing a further confirmation of the theoretical basis for the present invention.

It will be recalled that a greater sensitivity of the thermopile is obtained by reducing the transfer or loss of heat from the hot junction area or target 25. A thermopile which has high sensitivity will ordinarily comprise conductors having small cross-sectional areas, and later examples will be given of thermopiles constructed of wires of 1-mil diameter and less. After selection of the small diameter wires for high sensitivity and after decision as to the materials to yield high thermoelectric power for maximum output of the thermopile, the conditions set forth by Equation 8 provide for the further dimensioning of the wires of the conductors included in the thermopile to provide the ambient-free temperature characteristics. It will be observed that Equation 8 shows the ratio of the sum of the respective heat loss factors $(G+S+R)$ to the sum of the respective products of the heat loss factors and the respective temperature coefficients of thermal conductivity $(Gg+Ss+Rr)$ is equal to, or shall at least approximate equality with, the ratio of the temperature-voltage constant A to the temperature-voltage constant C, which constants are, of course, defined by Equation 5.

For some applications, the speed of response of the thermopile of the modification of Figs. 1–5 may be higher than desired. In such event, additional discs may be attached to the target 25 to add thermal mass. However, for thermopiles of greater speeds of response than of the type shown in Figs. 1–6, the modification of Fig. 7 may be utilized where the speed of response will be greatly increased over that of the earlier modification. As shown in Fig. 7, a wire 19 of Chromel alloy one mil in thickness flattened to one-half mil in diameter, is brazed or spot welded to a small target or radiation receiver 25a of nickel, one-tenth mil in thickness and square twenty mils on a side.

The opposite end of the wire 19 is spot welded to the end of conductor 26 which is itself secured to the face of ring 20 by a ceramic frit in manner described in connection with Fig. 1. The other element of the thermocouple comprises the wire 19a of constantan likewise comprising a wire flattened to one-half mil from an original diameter of one mil. One end is spot welded to the target 25a and the other end spot welded to the conductor 27 which is similarly secured to the face of ring 20 by a ceramic frit.

In accordance with the invention as already explained, there is provided a thermal shunt which achieves operation of the radiation-responsive device unaffected by change in ambient temperature. With a ring 20 of .2567 inch in diameter, the same as for the modification of Figs. 1–5, the thermal shunt comprises two conductive paths 28, 28 formed by a single nickel wire two mils in diameter and extending diametrically across ring 20 with the central portion thereof spot welded to target 25a. The thermal shunt also includes conductive paths 28a, 28a formed by a second wire of nickel one mil in diameter and similarly extending diametrically across ring 20 with the mid-portion spot welded to target 25a. Since there is provided welded construction at the target 25a, the ends of the wires forming the heat-conductive paths are secured to the upper face of ring 20 in intimate and good heat-exchanging relation therewith by the ceramic frit which likewise provides electrical insulation between the wires and the ring 20. Though the ends of the wires 28 and 28a could be secured in electrically conductive relation to ring 20, the insulated arrangement is preferred in order not electrically to ground any part of the sensitive element of the heat-responsive device. Such a heat-responsive or radiation-responsive device has been found satisfactorily to function with an output independent of an ambient temperature which changes within the range of from 60° F. to 160° F.

By providing the thermocouple elements 19 and 19a of relatively small cross-sectional area, greater sensitivity is achieved since for a given intensity of radiation applied to the target 25a the rise in temperature of the hot junctions will be greater due to less conduction of heat therefrom. Since both the Chromel and constantan wires have large positive temperature coefficients of heat conductivity, any rise in their temperature as by change in the ambient, increases their heat conductivity and tends to increase the effectiveness of the heat path. However, because of the small diameter of each wire the effect is of a low order, much less than it would be if the wires were of three mil diameter since there is a high thermal impedance established by the small cross-sectional area of each path. Accordingly, it will be seen that the degree of compensation needed will be correspondingly less and, therefore, the thermal shunts provided by the wires 28 and 28a, which are needed, are of small cross-sectional area and there is a relatively small transfer of heat through the thermal paths which means that there is a relatively small loss of sensitivity by reason of the inclusion of the thermal shunts.

A heat-responsive device of the type shown in Fig. 7 has also been constructed utilizing Chromel-constantan wires of one-half mil diameter flattened to approximately one-quarter mil thickness. In accordance with the present invention, a thermal shunt of a single wire, such as the wire 28 of Fig. 7, of nickel, of two mil diameter has been found satisfactory in producing an output which is independent of change in ambient temperature through the aforesaid range.

Referring to Fig. 8, the ring 20 is made somewhat larger than the corresponding ring of earlier modifications and in Fig. 8 the ring 20 is made of constantan.

Extending radially from a central target 25 are a plurality of constantan wires 50 which are attached at their opposite ends to the ring and to the target as by a ceramic frit in manner already described. There is welded to the inner end of each constantan wire 50 an end of Chromel wires 51 which are respectively soldered at their opposite ends to the constantan wires 50 at points spaced inwardly from the ring 20, each Chromel wire being of course connected at one end to one radial wire and at the opposite end to the adjacent radial wire of constantan. The soldered connections at the outer ends of constantan wires 51 are made relatively massive as by using a fairly large drop of solder to assure good heat dissipation from the cold junctions formed thereby. A lead wire 52 is soldered to a constantan wire 50a which forms a part of a thermocouple with the adjacent Chromel wire 51. Similarly, the other lead wire 53 is soldered to a Chromel wire 51a which joins the adjacent radially extending constantan wire 50 to form another thermocouple assembly. The soldered connections of the leads 52 and 53, of course, form a cold junction.

Pursuant to the present invention, with Chromel-constantan wires of three mil diameter the output of the thermopile may be made independent of change in ambient temperature by providing in manner already described four thermal shunts 54, 55, 56 and 57 each formed by copper wire of two mil diameter. These thermal shunts form heat-conduction paths between the receiver 25 and alternate cold junctions of the thermopile.

Referring to Fig. 9, the ring 20 may correspond with the similarly numbered ring of the modification of Figs. 1–5. In this modification of the invention, radially extending thermocouple elements 50 are formed by constantan wires of three mil diameter. They are secured to the target 25 in the same manner as described in connection with Fig. 8 with their opposite ends secured to the ring 20 by ceramic frits.

In Fig. 9 there are four wires 51 of Chromel each three mils in diameter, and there are four wires 55 of copper of two mils diameter. Hence, it will be seen that there are heat-conduction paths between the hot junction of the target 25 and the cold junction of ring 20 through three differing materials; that is through the Chromel wires, the constantan wires and the copper wires. In accordance with the invention, there has been combined in the modification of Fig. 9 the function of the thermal shunt with wires forming a part of the electrical system of the thermopile. That is to say, the addition of the copper wire to the Chromel-constantan combination provides the heat-conducting paths which result in an output of the thermopile independent of change of ambient temperature over the aforesaid range of from 60° F. to 160° F. without the need to provide thermal paths separate and independent from the electrical network. The underlying theory applicable to Fig. 9 which has already been set forth at length is equally applicable to the modification of Fig. 9, the copper wires then being considered as the paths providing the thermal shunt referred to in said theory.

Reference has already been made to the fact that by decreasing the diameter of the wires forming each thermocouple, the impedance of the heat-conducting path therethrough is greatly increased. If the wires are made quite small, the impedance will limit to a negligible degree the amount of heat which may be conducted therethrough. Stated differently, the heat losses due to heat conduction through the wires will then be of minor importance compared with the gaseous losses. If the thermopile be constructed of fine wires such as eight two-mil diameter copper-constantan thermocouples, there will be over-compensation because most of the heat will then flow through the copper, having a temperature coefficient of conductivity of negative sign. That is to say, the output, with change in ambient temperature of such a thermopile, will increase with increase in ambient temperature. In accordance with the present invention, the thermopile of Fig. 9 will be fully compensated by utilizing constantan wires 50, each of three-tenths mil diameter, and using all associated thermocouple wires of copper of three-tenths mil diameter, the copper providing the thermal-shunt corrective action. If finer wires than the three-tenth mil diameter were used the output voltage will decrease with increase of ambient temperature.

The thermal shunt or equivalent heat-conducting path will be equally effective for thermopiles where the gaseous losses are of major magnitude. The gaseous losses increase with rising ambient temperature and, hence, the conductive path by the thermal shunt will be in the opposite direction.

Referring to the modification of Fig. 10, it will be observed there is provided a ring 60 and that there extend across the ring a plurality of thermocouple elements 61 which, in conjunction with the diagonally extending thermocouple elements 62, form differentially connected thermocouples. That is to say, the diagonally extending elements 62 are secured to the elements 61 and as by a ceramic frit to an underlying target or radiation receiver 63 whereas the opposite ends of said diagonally extending wires are likewise secured to adjacent wires 61 and by a ceramic frit to a second target or radiation receiver 64. Lead wires 65 and 66 are connected to the outermost wires 61, a voltage appearing across the output of the thermopile whenever the temperature of the junctions at target 63 differs from the temperature of the junctions at the target 64. In order to make the output voltage across the leads 65 and 66 independent of change in ambient temperature there can be provided in accordance with the present invention thermal shunts 67 and 68, thermally interconnecting the targets 63 and 64, the thermal conduction factor of the thermal shunting paths 67 and 68 being determined in generally the same manner as above set forth.

It is also to be understood that individual thermocouples in the differential thermopile may be selected of materials which will of themselves perform the functions of the thermal shunts 67 and 68 in manner already set forth in connection with Fig. 9.

Reference has already been made to the desirability of selecting a thermal shunt with the proper sign for the coefficient of thermal conductivity. For example, where the solid heat-conduction paths formed by the thermocouple elements both have temperature coefficients of conductivity which are positive in sign, a thermal shunt having a coefficient of negative sign will ordinarily be indicated. Conversely, in a thermocouple such as copper-constantan, copper-antimony or bismuth-antimony, the thermal shunt will preferably be made of a material having a positive coefficient of thermal conductivity and thus may be made of constantan, Chromel, or the like.

What is claimed is:

1. A temperature-responsive device comprising at least one thermocouple, means supporting said thermocouple with its hot junction disposed for application of heat thereto, and a thermal shunt electrically insulated from said hot junction but thermally intimately connected thereto and forming at least one heat-conduction path from said hot junction to the cold junction of said thermocouple.

2. The combination set forth in claim 1 in which said thermocouple is of Chromel and constantan elements and the thermal shunt is of nickel.

3. The combination set forth in claim 2 in which the Chromel-constantan thermocouples are formed of wire approximately .002 inch in diameter and flattened, and the thermal shunt comprises an element of nickel having a cross section equal to that of nickel wire .005 inch in diameter.

4. The combination set forth in claim 2 in which the Chromel-constantan wires are relatively small about one mil diameter and the thermal shunt consists of nickel the cross-sectional area being approximately four times the cross-sectional area of the conductors of the thermocouple.

5. A thermopile comprising a central target, supporting structure spaced therefrom, at least three thermal conductivity paths extending between said target and said structure, two of said paths including a thermocouple having its hot junction thermally connected to said target and its cold junction thermally connected to said supporting structure, a solid heat conductor forming a third path and having a heat conductivity coefficient of sign opposite to that of one of the paths formed by one of the wires of the thermocouple for compensation due to changes in ambient temperature.

6. A radiation pyrometer including a diaphragm having an opening and a magnesium oxide coating on one face of the diaphragm to render more visible an image of the area from which radiation is directed to the pyrometer.

7. In an instrument of the radiation pyrometer type, a diaphragm having an opening and a magnesium oxide coating on a face of said diaphragm to render more visible from an end of the instrument opposite that receiving radiant energy in the infra-red portion of the spectrum an image of the area from which radiation is directed to the instrument.

8. A thermopile comprising thermocouple elements joined to form hot junctions at predetermined distances from cold juntions, the cross-sectional area and length of at least one of said elements being selected so as to provide low heat loss and high sensitivity of said thermocouple and which forms a first heat conduction path whose thermal conductivity changes with change in ambient temperature, at least another element of the thermopile being dimensioned as to area and length for change in its thermal conductivity in a direction and to such an extent that the resultant net change in the thermal conduction between said hot junctions and said cold junctions is controlled in magnitude and in sense to produce within a wide range of ambient temperature variation a voltage output from said thermopile which does not vary with such changes in said ambient temperature regardless of non-linearity of the curve of electromotive force vs. temperature for the thermoelectric materials comprising said thermocouple.

9. A thermopile comprising thermocouple elements joined to form hot junctions at predetermined distances from the cold junctions, the cross-sectional area and length of said elements being so selected as to provide the desired sensitivity of said thermopile, the heat conduction paths of said elements changing in thermal conductivity with change in ambient temperature, a thermal shunt extending between said hot junctions and said cold junctions, said shunt being of material for change in thermal conductivity in a direction opposite to that of said thermocouple elements and dimensioned as to area and length for change in thermal conduction to such an extent to compensate for said change in said thermal conduction of said thermocouple elements to produce substantially constant voltage output from said thermopile with constant input thereto for wide changes in said ambient temperature.

10. A heat-sensitive element for measuring apparatus, said element comprising two regions both varying in temperature in response to variations in ambient temperature, a plurality of paths by means of which heat flows from one to the other of said regions, two of said paths being of solid heat-conducting material having a temperature coefficient such that both of said paths tend to conduct more heat with a rise in ambient temperature, and a third path for the interchange of heat between said two regions, the material of said third path having a temperature coefficient such that said third path conducts less heat with a rise in ambient temperature, the dimensions of said third path being such that the net conduction of heat by all of said plurality of paths is of such value that an electrical characteristic of said sensitive element is maintained substantially constant over a substantial range of ambient temperature variation.

11. A heat-sensitive element for measuring apparatus, said element comprising two regions both varying in temperature in response to variations in ambient temperature, a plurality of paths by means of which heat flows from one to the other of said regions, two of said paths being of solid heat-conducting material having a temperature coefficient such that both of said paths tend to conduct less heat with a rise in ambient temperature, and a third path for the interchange of heat between said two regions, the material of said third path having a temperature coefficient such that said third path conducts more heat with a rise in ambient temperature, the dimensions of said third path being such that the net conduction of heat by all of said plurality of paths is of such value that an electrical characteristic of said sensitive element is maintained substantially constant over a substantial range of ambient temperature variation.

12. A heat-sensitive element for measuring apparatus, said element comprising a heat-receiving region and a cooler region displaced from said heat-receiving region, both regions varying in temperature in response to variations in ambient temperature, a plurality of paths by means of which heat flows between said heat-receiving region and said cooler region, two of said paths being of solid heat-conducting material having a temperature coefficient such that both of said paths tend to conduct more heat with a rise in ambient temperature, and a third path for the interchange of heat between said two regions, the material of said third path having a temperature coefficient such that said third path conducts less heat with a rise in ambient temperature, the dimensions of said third path being such that the net conduction of heat by all of said plurality of paths is of such value that an electrical characteristic of said sensitive element is maintained substantially constant over a substantial range of ambient temperature variation.

13. A heat-sensitive element for measuring apparatus, said element comprising two radiant energy receiving areas varying in temperature with variations in ambient temperature, a plurality of paths for heat to flow from one area to the other and to a source of reference temperature common to all said paths including wires coacting with said receiving areas, some of said wires being of a material, the thermal conductivity of which increases with a rise in ambient temperature, and other of said wires being of a material, the thermal conductivity of which decreases with a rise in ambient temperature, the dimensions of the heat path formed by said other of said wires being such that the net conduction of heat by all of said plurality of paths is of such values that an electrical characteristic of said sensitive element is maintained substantially constant over a substantial range of ambient temperature variation.

14. A heat-sensitive element for measuring apparatus, said element comprising two regions varying in temperature with change of ambient temperature, a plurality of solid conductive paths for heat to flow from one region to the other and to a source of reference temperature common to all, some of said paths being of a solid material of size less than 5 mil diameter wire, the thermal conductivity of which increases with a rise in ambient temperature, and other of said paths being of a material of size differing from said first-named paths, the thermal conductivity of which decreases with a rise in ambient temperature, the dimensions of the heat path formed by said other of said paths being such that the net conduction of heat by all of said plurality of paths is of such value that an electrical characteristic of said sensitive element is maintained substantially constant over a substantial range of ambient temperature variation.

15. A heat-sensitive device of high sensitivity characterized by low loss of heat from a heat-receiving area to an adjacent support, comprising conductors extending between said area and said support to form heat-conduction paths including at least two paths formed of materials having differing thermoelectric power and connected to form a hot junction at said heat-receiving area and a cold junction at said support, said conductors having diameters small to minimize loss of heat through their solid heat conduction paths, heat also being lost other than through said solid conduction paths as through a radiation path, said paths being effectively dimensioned to approximate equality between a first ratio of the sum of the respective heat loss factors of all heat loss paths to the sum of the respective products of each of said heat loss factors and the respective temperature coefficients of thermal conductivity of each of said paths and a second ratio of a temperature-voltage constant A to a temperature-voltage constant C, said constants A and C having values which satisfy the equation $$\Delta V = (A + CT) \Delta T$$

where $\Delta V$ = the voltage change for a small change in temperature, $\Delta T$, and $T$ = the ambient temperature above a reference level.

16. A heat-sensitive device of high sensitivity characterized by low loss of heat from a heat-receiving area to an adjacent support, comprising conductors extending between said area and said support to form heat-conduction paths including at least two paths formed of materials having differing thermoelectric power and connected to form a hot junction at said heat-receiving area and a cold junction at said support, said conductors having diameters small to minimize loss of heat through their solid heat conduction paths, heat also being lost other than through said solid conduction paths as through a radiation path, said conductors being dimensioned to approximate equality between a first ratio of the sum of the respective heat loss factors of all heat loss paths to the sum of the respective products of each of said heat loss factors and the respective temperature coefficients of thermal conductivity of each of said paths and a second ratio of a temperature-voltage constant A to a temperature-voltage constant C, said constants A and C having values which satisfy the equation $$\Delta V = (A + CT)\Delta T$$

where $\Delta V$ = the voltage change for a small change in temperature, $\Delta T$, and $T$ = the ambient temperature above a reference level.

17. A heat-sensitive device of high sensitivity characterized by low loss of heat from a heat-receiving area to an adjacent support, comprising conductors extending between said area and said support to form heat-conduction paths including at least two paths formed of materials having differing thermoelectric power and connected to form a hot junction at said heat-receiving area and a cold junction at said support, said conductors having diameters small to minimize loss of heat through their solid heat conduction paths, heat also being lost through a gaseous path and a radiation path, said paths being effectively dimensioned to approximate equality between a first ratio of the sum of the respective heat loss factors of all of said heat loss paths to the sum of the respective products of each of said heat loss factors and the respective temperature coefficients of thermal conductivity of each of said paths and a second ratio of a temperature-voltage constant A to a temperature-voltage constant C, said constants A and C having values which satisfy the equation $$\Delta V = (A + CT)\Delta T$$

where $\Delta V$ = the voltage change for a small change in temperature, $\Delta T$, and $T$ = the ambient temperature above a reference level.

18. A heat-sensitive device of high sensitivity characterized by low loss of heat from a heat-receiving area to an adjacent support, comprising conductors extending between said area and said support to form heat-conduction paths including at least two paths formed of materials having temperature coefficients of thermal conductivity of opposite sign and having differing thermoelectric power and connected to form a hot junction at said heat-receiving area and a cold junction at said support, said conductors having diameters small to minimize loss of heat through their solid heat-conduction paths, heat also being lost other than through said solid conduction paths as through a radiation path, said paths being effectively dimensioned to approximate equality between a first ratio of the sum of the respective heat loss factors of all heat loss paths to the sum of the respective products of each of said heat loss factors and the respective temperature coefficients of thermal conductivity of each of said paths and a second ratio of a temperature-voltage constant A to a temperature-voltage constant C, said constants A and C having values which satisfy the equation $$\Delta V = (A + CT)\Delta T$$

where $\Delta V$ = the voltage change for a small change in temperature, $\Delta T$, and $T$ = the ambient temperature above a reference level.

19. A heat-sensitive device of high sensitivity characterized by low loss of heat from a heat-receiving area to an adjacent support, comprising conductors extending between said area and said support to form heat-conduction paths including at least two paths formed of materials having differing thermoelectric power and connected to form a hot junction at said heat-receiving area and a cold junction at said support and at least one additional heat-conduction path electrically insulated from said junctions, the coefficient of at least one of said paths having a sign opposite to the sign of the temperature coefficient of at least one of the remaining paths of heat-conduction, said conductors having diameters small to minimize loss of heat through their solid heat conduction paths, heat also being lost other than through said solid conduction paths as through a radiation path, said conductors being dimensioned to approximate equality between a first ratio of the sum of the heat loss factors of each heat loss path to the sum of the respective products of each of said heat loss factors and the temperature coefficients of thermal conductivity of each of said paths and a second ratio of a temperature-voltage constant A to a temperature-voltage constant C, said constants A and C having values which satisfy the equation $$\Delta V = (A + CT)\Delta T$$

where $\Delta V$ = the voltage change for a small change in temperature, $\Delta T$, and $T$ = the ambient temperature above a reference level.

20. A heat-sensitive device of high sensitivity characterized by low loss of heat from a heat-receiving area to an adjacent support, comprising conductors of differing thermoelectric power connected to form a hot junction at said heat-receiving area and a cold junction at said support, said conductors having diameters small to minimize loss of heat through their solid heat conduction paths, heat also being lost through a gaseous path and a radiation path, a conductor extending between said area and said support forming a heat-conduction path having a temperature coefficient of thermal conductivity opposite to at least one of said first-named conductors, said paths being effectively dimensioned to approximate equality between a first ratio of the sum of the respective heat loss factors of all of said paths with respect to the sum of the respective products of the heat loss factors and the respective temperature coefficients of thermal conductivity of each of said paths and a second ratio of a temperature-voltage constant A to a temperature-voltage constant C, said constants A and C having values which satisfy the equation $$\Delta V = (A + CT)\Delta T$$

where $\Delta V$ = the voltage change for a small change in temperature, $\Delta T$, and $T$ = the ambient temperature above a reference level.

21. A heat-sensitive device of high sensitivity characterized by low loss of heat from a heat-receiving area to an adjacent support, comprising electrical conductors of differing thermoelectric power connected to form a hot junction at said heat-receiving area and a cold junction at said support, said conductors having diameters small to minimize loss of heat through their solid heat conduction paths, heat also being lost through a gaseous path and a radiation path, a thermal shunt comprising a heat conductor forming a heat-conduction path extending between said area and said support formed of a material having a coefficient of thermal conductivity of sign opposite to that of at least one of said conductors, said conductors and said shunt being effectively dimensioned to approximate equality between a first ratio of the sum of the respective heat loss factors of all said paths with respect to the sum of the respective products of the heat loss factors and the respective temperature coefficients of thermal conductivity of each of said paths and a second ratio of a temperature-voltage constant A to a temperature-voltage constant C, said constants A and C having values which satisfy the equation $$\Delta V = (A + CT) \Delta T$$

where $\Delta V =$ the voltage change for a small change in temperature, $\Delta T$, and $T =$ the ambient temperature above a reference level.

22. A heat-sensitive device of high sensitivity characterized by low loss of heat from a heat-receiving area to an adjacent support, comprising non-ferrous conductors extending between said area and said support to form heat-conduction paths including at least two paths formed of materials having differing thermoelectric power and connected to form a hot junction at said heat-receiving area and a cold junction at said support, said conductors having diameters small to minimize loss of heat through their solid heat conduction paths, heat also being lost other than through said solid conduction paths as through a radiation path, said paths being effectively dimensioned to approximate equality between a first ratio of the sum of the respective heat loss factors of all heat loss paths to the sum of the respective products of each of said heat loss factors and the respective temperature coefficients of thermal conductivity of each of said paths and a second ratio of a temperature-voltage constant A to a temperature-voltage constant C, said constants A and C having values which satisfy the equation $$\Delta V = (A + CT) \Delta T$$

where $\Delta V =$ the voltage change for a small change in temperature, $\Delta T$, and $T =$ the ambient temperature above a reference level.

23. A heat-sensitive device of high sensitivity characterized by low loss of heat from a heat-receiving area to an adjacent support, comprising conductors extending between said area and said support to form heat-conduction paths including at least two paths formed of materials having differing thermoelectric power and connected to form a hot junction at said heat-receiving area and a cold junction at said support, at least one of said conductors being a ferrous metal, a thermal shunt extending between said hot junction target area and said cold junction support, said conductors having diameters small to minimize loss of heat through their solid heat-conduction paths and through said thermal shunt, heat also being lost other than through said solid conduction paths as through a radiation path, said paths and said thermal shunt being effectively dimensioned to approximate equality between a first ratio of the sum of the respective heat loss factors of all heat loss paths to the sum of the respective products of each of said heat loss factors and the respective temperature coefficients of thermal conductivity of each of said paths and a second ratio of a temperature-voltage constant A to a temperature-voltage constant C, said constants A and C having values which satisfy the equation $$\Delta V = (A + CT) \Delta T$$

where $\Delta V =$ the voltage change for a small change in temperature, $\Delta T$, and $T =$ the ambient temperature above a reference level.

24. A temperature-responsive device comprising at least one thermocouple, means supporting said thermocouple with its hot junction disposed for application of heat thereto, a thermal shunt electrically insulated from said hot junction but thermally intimately connected thereto and forming at least one heat-conduction path from said hot junction to the cold junction of said thermocouple, a sub-housing forming an enclosure for said at least one thermocouple and said thermal shunt, said sub-housing being formed of a material having high thermal conductivity, heat-conductive structure supporting the cold junctions of said thermocouple, said heat-conductive structure having projections of limited cross-sectional area engaging said sub-housing for support therefrom to limit the heat-conduction path therebetween, a main housing enclosing said sub-housing, and supporting structure carried by said main housing and having extensions of limited cross-sectional area disposed in heat-conductive relation with said sub-housing, the cross-sectional areas of said heat-conductive paths, the mass of said heat-conductive structure and the thickness of said sub-housing being selected for the same change in temperature as the hot junctions and of the cold junctions as respectively affected by changes in ambient temperature.

25. A temperature-responsive device comprising at least one thermocouple, means supporting said thermocouple with its hot junction disposed for application of heat thereto, a thermal shunt electrically insulated from said hot junction but thermally intimately connected thereto and forming at least one heat-conduction path from said hot junction to the cold junction of said thermocouple, a sub-housing forming an enclosure for said at least one thermocouple and said thermal shunt, said sub-housing being formed of a material having high thermal conductivity, heat-conductive structure supporting the cold junctions of said thermocouple, means supporting said structure in inwardly spaced symmetrical relation to said inner housing, said heat-conductive structure having projections of limited cross-sectional area engaging said sub-housing for support therefrom to limit the heat-conduction path therebetween, a main housing enclosing said sub-housing and supporting structure carried by said main housing and having extensions of limited cross-sectional area disposed in heat-conductive relation with said sub-housing, the cross-sectional areas of said heat-conductive paths, the mass of said heat-conductive structure and the thickness of said sub-housing being selected for the same change in temperature as the hot junctions and of the cold junctions as respectively affected by changes in ambient temperature.

26. A temperature-responsive device comprising at least one thermocouple, means supporting said thermocouple with its hot junction disposed for application of heat thereto, a thermal shunt electrically insulated from said hot junction but thermally intimately connected thereto and forming at least one heat-conduction path from said hot junction to the cold junction of said thermocouple, a sub-housing forming an enclosure for said at least one thermocouple and said thermal shunt, said sub-housing being formed of a material having high thermal conductivity, heat-conductive structure supporting the cold junctions of said thermocouple, means supporting said structure in inwardly spaced symmetrical relation to said inner housing comprising extensions of relatively small cross-sectional area extending radially of said inner housing, said heat-conductive structure having projections of limited cross-sectional area engaging said sub-housing for support therefrom to limit the heat-conduction path therebetween, a main housing enclosing said sub-housing and supporting structure carried by said main housing and having extensions of limited cross-sectional area disposed in heat-conductive relation with said sub-housing, the cross-sectional areas of said heat-conductive paths, the mass of said heat-conductive structure and the thickness of said sub-housing being selected for the same change in temperature as the hot junctions and of the cold junctions as respectively affected by changes in ambient temperature.

27. A temperature-responsive device comprising at least one thermocouple having a hot junction and a cold junction, means supporting said thermocouple with its hot junction disposed for application of radiant heat thereto and for controlling temperature of the hot junction and of the cold junction so that they change in like manner with transient changes in ambient temperature comprising a sub-housing of good heat-conducting material surrounding said thermocouple, and heat-conductive structure in large part spaced from said sub-housing for supporting the hot junction in radiant energy-receiving relation to an opening through said sub-housing, said heat-conductive structure having extensions forming heat-conducting paths between it and said sub-housing, the dimensions and masses of said heat-conductive structure, said housing and of said extensions controlling the temperature changes of said cold junction in response to change in ambient temperature in like manner with change in temperature of said hot junction with change in ambient temperature.

28. A temperature-responsive device comprising a group of thermocouples, a heat-conductive structure, having an opening at the center, supporting the hot junctions within the opening and supporting the cold junctions from said heat-conductive structure in good thermal relation therewith, a sub-housing of good heat-conducting material enclosing said thermocouples and said structure, projections of limited area and of good heat conduction interconnecting said structure and said housing, one wall of said sub-housing having an opening for admission of energy to said hot junctions through a path avoiding said heat-conductive structure, the cross-sectional areas of said extensions being selected with reference to the mass of said heat-conductive structure and with respect to the mass of said inner housing for regulation of the temperature change of said cold junction in manner corresponding with temperature change of said hot junctions due solely to change in ambient temperature.

29. The combination set forth in claim 28 in which said wall comprises a diaphragm coated with magnesium oxide to render more visible an image of the area from which radiation is directed to said thermocouples.

30. In a radiant energy sensing device having a detector element to be sighted upon a source of radiant energy for measuring the intensity thereof, a diaphragm with an opening for passage of radiant energy to a receiving area of said detector element, an optical means, including a window of heat-resistant material which passes radiant energy in the visible and in the infrared portion of the spectrum, for projecting an image of said source toward said opening and upon said diaphragm, an image-receiving area of said diaphragm having a coating of magnesium oxide to enhance the visibility of said image range for accurate sighting of said device.

31. A heat-sensitive device comprising heat-receiving areas spaced one from the other, thermocouples connected in electrical opposition with the hot junctions thereof at one area and the cold junctions at the other area, and solid heat-conductive means interconnecting said target areas for interchange of heat, said heat-conductive means having a size and a temperature coefficient for controlling the interchange of heat between said areas to maintain unchanged the output from said thermocouples upon change only of ambient temperature.

32. An ambient temperature independent thermopile comprising means to support a plurality of electrically conductive elements substantially parallel to each other, a plurality of other electrically conductive elements connecting said first-mentioned elements to form a group of differentially connected thermocouples with two distinct groups of junctions, substantially symmetrical target areas associated with each group of junctions and auxiliary solid heat-conducting means connected between said areas and of size and temperature coefficient to control the interchange of heat between said areas thermally to maintain unchanged the output from said group of thermocouples upon change only of ambient temperature.

WILLIAM G. FASTIE.

REFERENCES CITED

The following references are of record in the file of this patent:

UNITED STATES PATENTS

| Number | Name | Date |
|---|---|---|
| 1,533,740 | Keinath | Apr. 14, 1925 |
| 1,553,789 | Moeller | Sept. 15, 1925 |
| 2,186,948 | Adler | Jan. 16, 1940 |
| 2,357,193 | Harrison | Aug. 29, 1944 |

OTHER REFERENCES

"Temperature," Amer. Inst. of Physics, 1941, pages 1215–1217.